Figure 1:
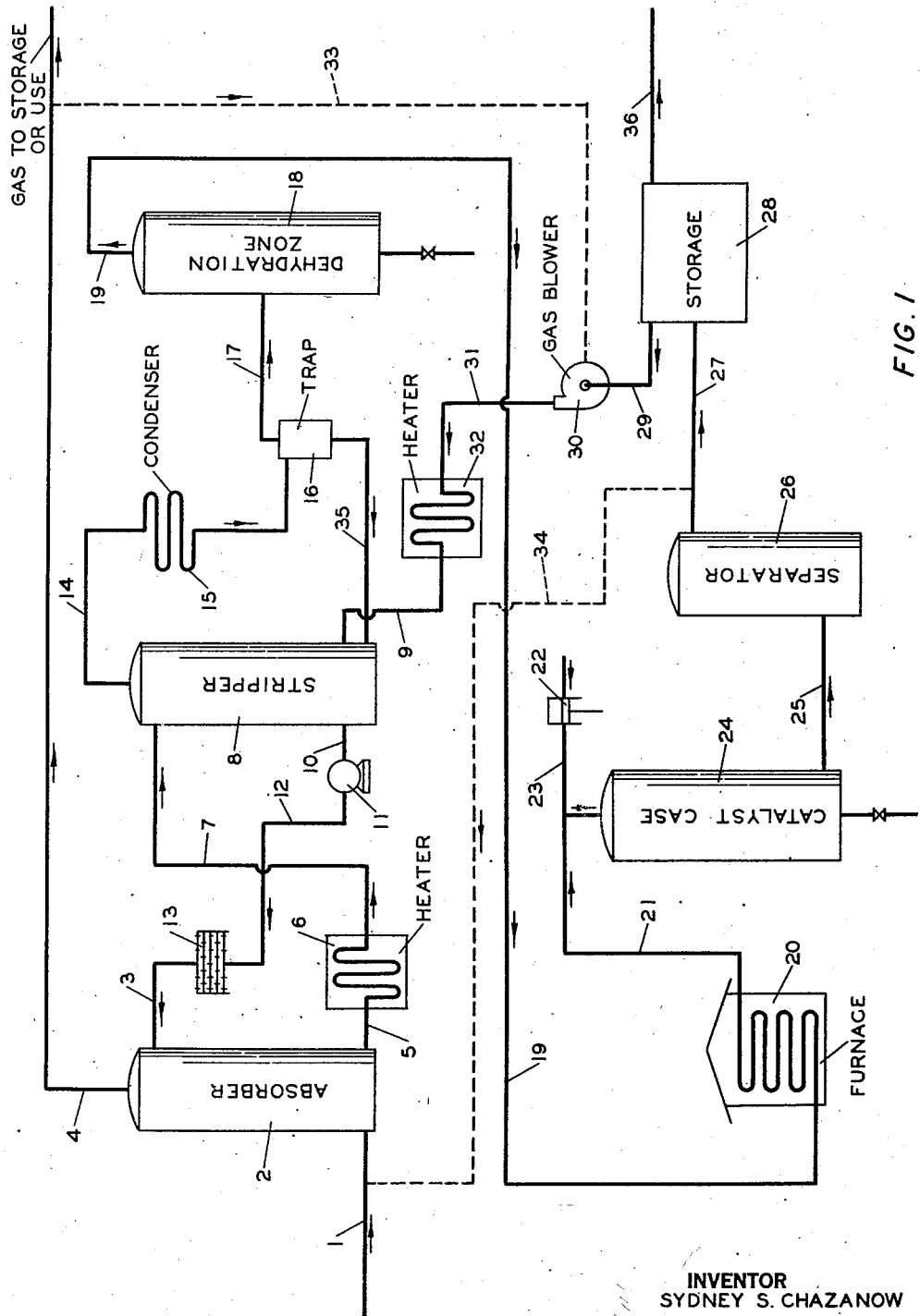

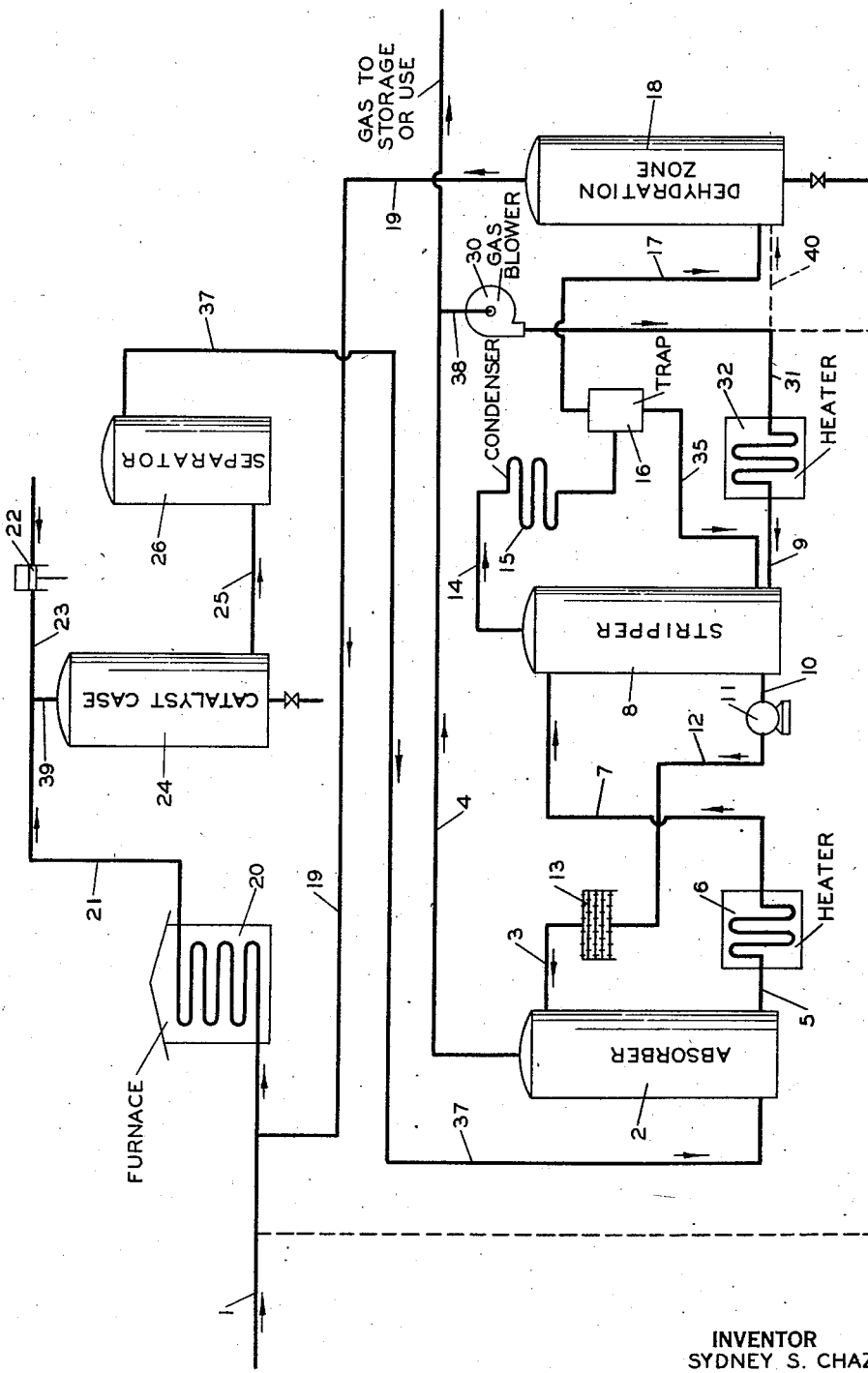

Patented Aug. 8, 1944

2,355,147

UNITED STATES PATENT OFFICE 2,355,147

PROCESS FOR THE TREATMENT OF HYDROCARBON GASES

Sydney S. Chazanow, Bartlesville, Okla., assignor to Phillips Petroleum Company, a corporation of Delaware Application January 30, 1942, Serial No. 428,975

3 Claims. (Cl. 23—3)

This invention relates to the purification of hydrocarbon gases containing hydrogen sulfide. More specifically this invention relates to the removal of hydrogen sulfide from hydrocarbon gases and the concurrent or subsequent conversion of the hydrogen sulfide to free sulfur. The invention has particular reference to a combination process applicable to gases of either high or low sulfur wherein the advantages and economic benefits of two methods of gas purification are combined to produce greatly improved results and efficiency in the substantially complete removal of hydrogen sulfide.

The problem of removing hydrogen sulfide from hydrocarbon gases has received extensive study, and many processes have been proposed for commercial applications. In general, these processes may be considered to represent variations of two basic principles, i. e., chemical or physical absorption and catalytic conversion, and each class has had specific and well-defined fields of application.

The chemical removal processes have been directed principally to the treatment of relatively low sulfur gases to produce a hydrogen sulfide-free product. Low sulfur gases are obviously preferable when complete removal is desired since chemical costs are lower for non-regenerative absorbents and operating costs are lower for processes utilizing regenerable absorbents. And, since the actual quantities of hydrogen sulfide recoverable from low sulfur gases are small, the economics of by-product sulfur manufacture have appeared less promising on the basis of processing the entire gas stream containing low concentrations of hydrogen sulfide.

The second class of removal process involving the catalytic oxidation of hydrogen sulfide to free sulfur is featured by the concurrent production of a substantially purified gas and a salable by-product. One such process recently described employs a bauxite catalyst and air to oxidize the hydrogen sulfide selectively to free sulfur. This type of process has been directed principally to the treatment of high sulfur gases because of the greater quantities of sulfur produced, and hence the lower net treating cost. However, due to the equilibrium reached in the oxidation reaction, the conversion of hydrogen sulfide may not be entirely complete in a single catalytic treatment, being halted under some conditions after 95 to 98 per cent removal. A second treating stage with special operating control and/or intermediate dehydration produces further removal to values which are suitable for most utilizations, but the economics of a second stage are often less favorable, at least on the basis of the amount of sulfur produced since operating and investment costs are somewhat increased.

It is an object of the present invention to provide a combination of the two types of removal processes whereby each is utilized in a manner which obtains its optimum operating and economic results. By means of the novel process to be described, hydrogen sulfide removal from either high or low sulfur gases is conducted to produce a substantially hydrogen sulfide-free gas with a maximum recovery of by-product sulfur and minimum investment and operating costs.

While the process of this invention comprises the same two basic operations, namely absorption and oxidation, the sequence of these steps is ordinarily determined by the hydrogen sulfide content of the gas to be purified. Although no specific hydrogen sulfide content may be termed the criterion for selecting the sequence of operations, the following method of selection may be stated without limiting the process thereto. When the raw gas contains less than about 200 to 500 grains per 100 cubic feet, absorption may be accomplished in the initial step. With higher sulfur gases it may be desirable to accomplish catalytic oxidation as the first step.

I have found that greatly improved results are obtained when a low sulfur gas is first contacted with an absorbing solution which absorbs hydrogen sulfide in one zone and disengages it in a second higher temperature zone from which it may be removed in any desired concentration and submitted to catalytic oxidation for the production of free sulfur. By this sequence of operations purification is substantially complete and the net return on the by-product sulfur manufactured is much higher. This latter advantage is principally due to more efficient conversion and much smaller plant size and investment than is possible when the entire volume of low sulfur gas is catalytically treated.

In another closely related adaptation of the combination process I have found that high sulfur gases are treated with improved efficiency when subjected to the alternate sequence of operations. Thus a high sulfur gas is first treated in a single stage to catalytically oxidize a major proportion, say 90 to 98 per cent, of the hydrogen sulfide. Then, after recovery of the sulfur, the remaining hydrogen sulfide is absorbed by contacting the gas with a regenerable absorbing solution, and a substantially purified gas is obtained. The hydrogen sulfide disengaged from the absorbing solution is simply removed in suitable concentrations and added to the raw gas stream ahead of the oxidation step so that a maximum recovery of sulfur is obtained at no increase in costs.

Two specific arrangements of equipment which may be used for practicing this invention are illustrated in the accompanying diagrams. Figure 1 shows a method which is usually preferred in the treatment of gases containing low concentrations of hydrogen sulfide. In the purification of gases containing large amounts of hydrogen sulfide, however, it is ordinarily preferable to employ an arrangement like that in Figure 2. When operation is in accordance with Figure 1 the untreated gas enters the unit by line 1, passes into the absorber 2, and flows upward countercurrent to a descending stream of an alkaline solution which entered the absorber 2 by line 3. The alkaline solution removes substantially all of the hydrogen sulfide contained in the gas, which leaves the absorber by line 4, proceeding to storage and/or further processing. The alkaline solution, fouled with hydrogen sulfide, leaves the absorber 2 by line 5, traversing the heater 6, and passing by line 7 to stripping unit 8, wherein the hydrogen sulfide is stripped out by heat and a stream of gas, and the alkaline liquor then leaves stripper 8, passing by line 10, to pump 11. The pump 11 forces the reactivated alkaline solution by line 12 through cooler 13 and line 3 to the top of absorber 2, for the absorption of additional amounts of hydrogen sulfide. At the bottom of stripping unit 8 a hot carrier gas is supplied by line 9 to assist in removing the hydrogen sulfide from the foul alkaline liquor. The gas passes upward through the stripping unit 8, and, having picked up a large amount of hydrogen sulfide, passes out by line 14 to condenser 15 and trap 16, for removal of water and entrained alkaline-reacting substances. The condensate in trap 16 is returned to the stripping unit 8 by line 35. The gas passes by line 17 to dehydrating zone 18, whence the dehydrated gas passes by line 19 to the second part of the process.

By line 19, the gas enters furnace 20, is heated to reaction temperature and passes by line 21 to the catalyst case 24. Air is added to the stream by compressor 22 and line 23. In the catalyst case 24, the hydrogen sulfide is oxidized to free sulfur and water. The gas stream containing free sulfur and water passes by line 25 to separating zone 26, wherein the sulfur is separated and recovered. The gas freed of sulfur then passes by line 27 to storage 28. Excess gas collecting in storage 28 may be removed intermittently or continuously by line 36. The gas blower 30 takes the gas from storage 28 by line 29 and forces it by line 31 to heater 32, whence the hot gas passes by line 9 to the base of the stripper 8 for stripping out further amounts of hydrogen sulfide.

An alternate method of providing the stripping gas is also illustrated in Figure 1. In this procedure lines 27 and 29 and storage zone 28 are not used, and the stripping gas is obtained by diverting a portion of the treated gas from line 4 by line 33 to the blower 30. The gas freed of sulfur in the separating zone 26 passes by line 34 to line 1 and is contacted by the alkaline absorbing solution along with the raw gas. Either of these methods may be used with the lower concentrations of hydrogen sulfide in the raw gas.

In operating by the method illustrated in Figure 1, air is continuously added by line 23 to supply oxygen. Thus the nitrogen content of the stripping gas is increased in each cycle. This necessitates intermittent or continuous withdrawal of the gas in the storage zone 28. As a result, the stripping gas tends to approach a composition substantially comprising nitrogen and is therefore available as a source of nitrogen for which comparatively little purification should be necessary to yield a pure product.

Figure 2 shows the sequence of operations most satisfactory for treating a high sulfur gas. According to this diagram the raw gas passes into the furnace 20 by line 1, and then by line 21 passes to line 39 near the entrance to the conversion zone 24. The compressor 22 supplies air by line 23 to line 39 by which the air-gas mixture enters the catalyst case 24, wherein the hydrogen sulfide is oxidized to free sulfur and water vapor. The vaporous conversion products pass by line 25 to separating zone 26 for removal of the sulfur. The gas freed of elementary sulfur but containing a small amount of hydrogen sulfide then passes by line 37 to absorber 2 flowing countercurrent to a stream of alkaline absorbent designed to remove the remaining traces of hydrogen sulfide. The purified gas passes out to storage by line 4. The alkaline absorbing solution which enters the absorbing zone by line 3 leaves by line 5 after absorbing a large amount of hydrogen sulfide. The fouled solution enters heater 6 by line 5, and then passed by line 7 to the stripping zone 8, moving countercurrent to a hot stripping gas supplied by line 9. The hydrogen sulfide is removed by the combined action of the heat and the stripping gas, and passes out with the stripping gas by line 14. The stripped alkaline liquor passes by line 10 to pump 11 which forces the liquor by line 12 through cooler 13 to the absorbing zone by line 3. The stripping gas is supplied by removing a portion of the finished gas from line 4 by line 38 to gas blower 30, which forces the gas by line 31 through heater 32 and line 9 to the stripping zone 8. Alternately, a portion of the raw gas may be diverted from line 1 by line 41 to line 31, heater 32, line 9 and stripping zone 8. The gas in line 14, containing a high concentration of hydrogen sulfide, passes to condenser 15 and water trap 16, then by line 17 to dehydrating zone 18. The dried gas then passes by line 19 to line 1 and re-enters the furnace and conversion system in company with the untreated gas. Line 35 is used to return condensate from trap 16 to the system.

It will be noted that the arrangement of Figure 2 employs the same equipment as shown in Figure 1, but the flow of the gas is changed. By this means the load on the absorbing and stripping units is greatly reduced and a completely hydrogen sulfide-free product may be obtained with a single oxidation step.

The absorbing solutions used in the operation of this invention are generally aqueous solutions of weakly alkaline compounds which are capable of holding hydrogen sulfide at low absorption temperatures and losing hydrogen sulfide at elevated stripping temperatures. For example, solutions of aliphatic amines, tripotassium phosphate, sodium phenolate, sodium and potassium carbonate, combinations of amines with salts of weak amino-carboxylic acids and the like may be used as can be determined in the individual case by availability or convenience. All of these reagents have a substantial capacity for hydrogen sulfide at absorption temperatures, and substantially no capacity for hydrogen sulfide at elevated stripping temperatures. In most cases the use of a stripping gas is not essential to disengaging the hydrogen sulfide since the hydrogen sulfide can be expelled by boiling the solution alone. However, the stripping action contributes to the speed and completeness of the operation and the gas itself is necessary for another purpose. The gas supplied to the stripping zone is necessary to dilute the hydrogen sulfide and to provide a gas mixture containing a predetermined and preferably substantially constant concentration of hydrogen sulfide in the gas to be processed in the oxidizing step of this process. This method of operation is, therefore, useful not only in the improved regeneration of the alkaline solution by the stripping gas, but also by its function of blending up the charge stock for the oxidizing step.

In general, the best operation is obtained by conducting the absorption step at the prevailing pressure of the process or associated processes supplying or utilizing the gases. Special conditions may require variations but the efficiency of absorption is not greatly affected. Similarly the stripping step may be conducted at low super-atmospheric pressures which are most suitable in view of the subsequent treatment of the hydrogen sulfide concentrates recovered. It is ordinarily preferred to operate the absorption step at atmospheric temperatures, usually depending upon the temperature of available cooling water. In general, these temperatures may be in the range of about 40 to 130° F. The lower temperatures provide better absorption which results in decreased circulation of the alkaline reagent.

The catalytic oxidation step is conducted with a catalyst and under temperature conditions which produce selective oxidation of the hydrogen sulfide to free sulfur and with the necessary oxygen furnished by admixture with air. The feed mixture to the oxidation catalyst may contain from 400 to 4000 grains of hydrogen sulfide per 100 cubic feet, but since the oxidation reaction is exothermic it is ordinarily preferred to treat concentrations ranging from 800 to about 2000 grains per 100 cubic feet when special temperature control methods are not provided.

Although the oxidation step is adaptable to the use of a number of catalysts, it is preferred to employ a bauxite catalyst. This material is rugged and long-lived in service and is highly active after substantial dehydration. Further, the catalyst may be reactivated after a decline in activity by treatment with air or an oxygen-containing gas at temperatures promoting the combustion of deposits responsible for the decline. Bauxite exhibits satisfactory selectivity in the oxidation of hydrogen sulfide to free sulfur at temperatures within the range of about 400 to about 600° F. with substantially no further oxidation of the free sulfur or of the hydrocarbons.

Since the oxidation is an exothermic reaction, the temperature of the catalyst is controlled within the abovementioned range by special control measures, or by regulation of the concentration of hydrogen sulfide in the gas feed to the catalyst. When the feed is obtained from the stripping zone of the absorption step, the hydrogen sulfide concentration is adjusted, as previously noted, by control of the volume of stripping gas admitted. This regulation is applicable to the operations outlined in both Figure 1 and Figure 2, and is necessary to the proper operation of the oxidation step since undiluted hydrogen sulfide or even gases containing larger concentrations than those noted above cannot be satisfactorily handled directly over the catalyst.

The oxidation step may be conveniently operated at low superatmospheric pressures with the range of 15 to 150 pounds per square inch gage being preferred. However, where closely-associated operations require other pressure conditions, the oxidation step is satisfactorily operated at higher or lower pressures.

In order to illustrate the operation of this invention the following operations are described.

Example I

A natural gas containing 300 grains of hydrogen sulfide per 100 cubic feet was passed through an absorbing tower countercurrent to a solution of mono-ethanolamine. The gas leaving the absorber was substantially free of hydrogen sulfide and after a supplementary drying operation, was suitable for pipeline transportation. The foul amine solution was pumped over the top of the stripping tower at a temperature of 215° F., flowing down countercurrent to a stripping gas which enters the column at its base at about 220° F. The stripping gas is supplied at a rate equivalent to 30 per cent of the raw gas feed so that, after dehydration, the charge gas for the oxidation step contains about 1000 grains per 100 cubic feet. This gas is heated to about 420° F., mixed with air and passed over a bauxite catalyst, with a conversion in excess of 95%. Following recovery of the sulfur, the gas was returned to strip more foul solution. This small oxidation unit yielded more than 400 pounds of sulfur per million cubic feet of the purified natural gas, whereas if the entire gas stream were treated through the catalytic step the increased operating and investment costs would overbalance the return on the amount of sulfur produced.

Example II

A refinery gas containing 1500 grains of hydrogen sulfide per 100 cubic feet is to be treated for use as a raw material in further processing to liquid products. Since the hydrogen sulfide concentration is relatively high, treatment is according to the method of Figure 2, wherein the oxidation step is performed first. The gas is processed at the rate of one million cubic feet per day. With the hydrogen sulfide returned from the absorption step, the charge to the catalyst contains about 1450 grains per 100 cubic feet. The gas, mixed with air, enters the catalyst at 415° F. and then passes to the separating zone where the sulfur is removed. The gas, freed of elementary sulfur and containing about 40 to 50 grains of hydrogen sulfide per 100 cubic feet is passed to the absorber where it is contacted with a mono- and diethanolamine solution. After passing through the absorber, the gas is free of hydrogen sulfide and is piped to storage. The foul solution is reactivated in the stripping unit, which it enters at a temperature of 230° F., flowing countercurrent to the stripping gas, which is supplied at the rate of 700 cubic feet per minute. The foul gas leaving the stripping zone is cooled to condense most of its water content and then dehydrated before returning it to the feed gas entering the furnace at the beginning of the oxidation process. This plant can produce a little more than one ton of sulfur per million cubic feet of gas together with a substantially hydrogen sulfide-free gas.

It will be obvious that many variations in details and arrangements may be made in the process under the provisions of this invention. The illustrative examples, operating diagrams, and descriptive matter serve to point out properly the operation of this invention, and are not intended as limitations. The limitations upon this process are expressed only in the attached claims.

I claim:

1. A process for the purification of hydrocarbon gases containing hydrogen sulfide comprising absorbing the hydrogen sulfide from said gas in an alkaline-reacting aqueous solution, capable of fixing hydrogen sulfide at low temperatures and of disengaging the hydrogen sulfide at elevated temperatures, and recovering said purified gas at the exit of the absorbing zone; heating the alkaline solution containing hydrogen sulfide, passing an inert gas in contact therewith to assist in the removal of the hydrogen sulfide from the alkaline solution, cooling the reactivated alkaline solution and returning same to absorb additional amounts of hydrogen sulfide; drying the said inert gas containing hydrogen sulfide, passing the same to a hydrogen sulfide oxidation step, wherein after admixture with air and passage over an oxidation catalyst the hydrogen sulfide is converted to free sulfur and water, separating and recovering the sulfur and returning the said inert gas to assist in stripping further amounts of said alkaline solution.

2. A process for the purification of hydrocarbon gases containing hydrogen sulfide comprising heating the gases, adding air thereto and passing the air-gas mixture over a bauxite catalyst to convert a substantial portion of the hydrogen sulfide to free sulfur and water vapor, separating and recovering the sulfur, passing the gas containing some unconverted hydrogen sulfide into an absorbing zone in contact with an alkaline-reacting aqueous solution adapted to fix hydrogen sulfide at low temperatures and to disengage hydrogen sulfide at elevated temperatures, recovering the purified gas at the exit of the absorbing zone, heating the alkaline solution to disengage the hydrogen sulfide in a stream of heated inert stripping gas, returning the reactivated alkaline solution to absorb additional amounts of hydrogen sulfide; and passing the inert stripping gas containing the disengaged hydrogen sulfide to the hydrogen sulfide oxidation step for further conversion of the hydrogen sulfide to water and elementary sulfur.

3. A process for the purification of hydrocarbon gases containing up to about 500 grains of hydrogen sulfide per 100 cubic feet comprising removing said hydrogen sulfide from the hydrocarbon gas by absorption in an alkaline-reacting aqueous solution capable of fixing hydrogen sulfide at low temperatures and disengaging hydrogen sulfide at elevated temperatures, and recovering the purified gas; disengaging the hydrogen sulfide from the alkaline solution by heating and contacting with an inert stripping gas, returning the reactivated alkaline solution to absorb further amounts of hydrogen sulfide, passing the hydrogen sulfide-bearing stripping gas mixed with air over a bauxite catalyst in the temperature range of about 400° F. to about 600° F. to convert the hydrogen sulfide into elementary sulfur, separating the elementary sulfur and returning the inert gas for disengaging additional amounts of hydrogen sulfide.

SYDNEY S. CHAZANOW.